Figure 1:
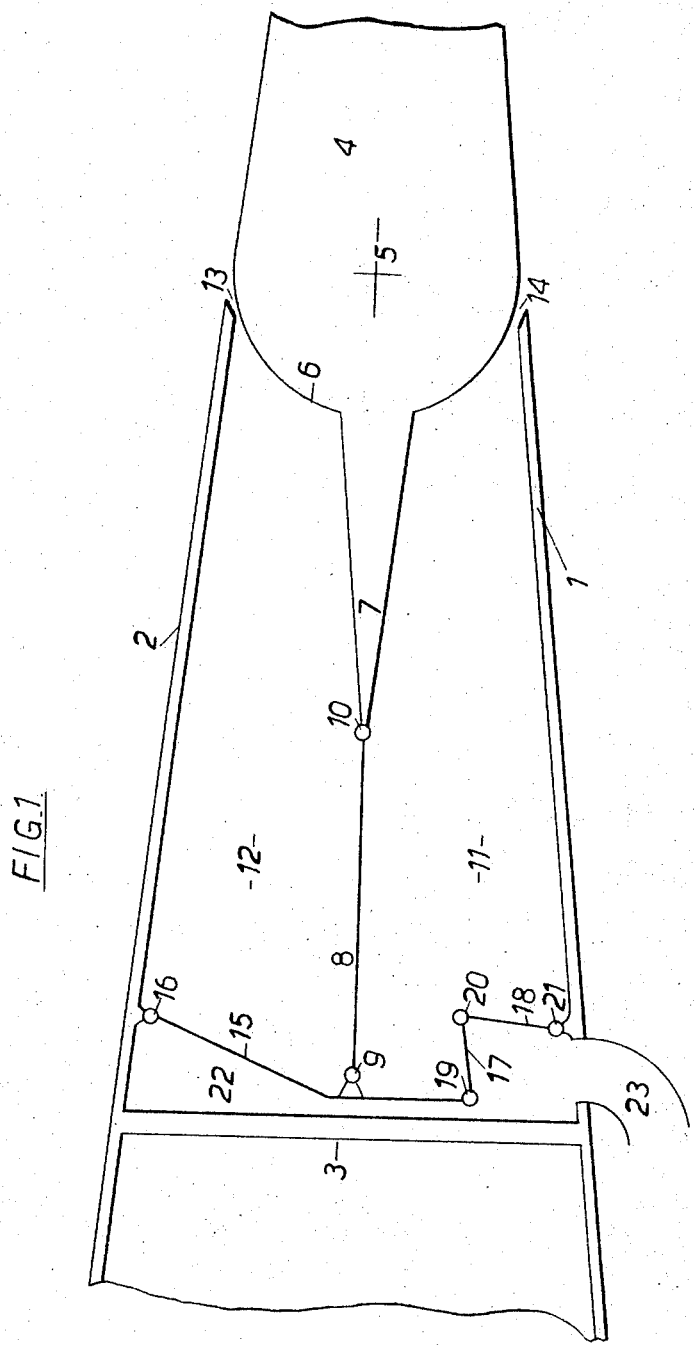

United States Patent
McRae et al.

[15] 3,695,558

[45] Oct. 3, 1972

[54] AIRCRAFT

[72] Inventors: David Milwain McRae; Andrew Douglas Watt, both of Hatfield, England

[73] Assignee: Hawker Siddeley Aviation Limited, Kingston-upon-Thames, Surrey, England

[22] Filed: May 18, 1970

[21] Appl. No.: 37,972

[52] U.S. Cl. ................................244/83 D, 244/90
[51] Int. Cl. ........................B64c 13/16, B64c 9/30
[58] Field of Search ........244/83, 83 D, 90, 90 B, 42, 244/42 A, 85

[56] References Cited

UNITED STATES PATENTS

| | | | |
|---|---|---|---|
| 2,281,696 | 5/1942 | Johnson | 244/90 |
| 2,597,769 | 5/1952 | Ashkenas | 244/85 |

FOREIGN PATENTS OR APPLICATIONS

| | | | |
|---|---|---|---|
| 568,910 | 4/1945 | Great Britain | 244/90 |
| 574,152 | 12/1945 | Great Britain | 244/90 |
| 642,042 | 2/1937 | Germany | 244/90 |

*Primary Examiner*—Milton Buchler
*Assistant Examiner*—Carl A. Rutledge
*Attorney*—Dowell & Dowell

[57] ABSTRACT

An arrangement for the aerodynamic balancing of aircraft control surfaces in which the control surface has forward extension into a chamber within the airframe. This forward extension is coupled to a diaphragm which spans the chamber in a fore-and-aft direction and is in substantial sealing relationship with the fore-and-aft walls of the chamber. The diaphragm moves laterally with movement of the control surface, and the chamber is thereby effectively partitioned into two variable volume spaces to which are admitted the respective external pressures at opposite sides of the control surface.

8 Claims, 5 Drawing Figures

AIRCRAFT

This invention relates to the aerodynamic balancing of aircraft control surfaces.

Aircraft control surfaces usually incorporate a degree of aerodynamic balancing so as to reduce the forces which the pilot has to apply. The simplest form of aerodynamic balancing is achieved by an off-set hinge which has the effect of displacing the nose portion of the control surface in the opposite direction to the main portion of the surface. While this arrangement is both simple and effective it does, unfortunately, carry a considerable drag penalty.

An alternative well known arrangement is to provide a space in front of the control surface, enclosed by shrouds, in which a vane-type forward extension of the control surface is influenced by differential pressure, obtained from either side of the control surface. Such an arrangement has the advantage of causing comparatively little drag but the degree of assistance given to the pilot is small, the maximum length of the vane being restricted owing to the limited space usually available and the angular travel required. Some improvement can be obtained by hinging a further member to the nose of the vane but the degree of assistance available is still limited, owing to the fact that the space to accomodate such devices cannot extend forward beyond the rear spar of the fixed part of the aircraft surface and it is normally undesirable to reposition this spar forward more than a small amount.

An object of this invention is to provide an arrangement which gives a substantial increase in the degree of balance achieved without occupying an unduly large space.

According to one aspect of the present invention, the nose of the movable control surface has a forward extension or vane which is articulated at an intermediate point along its length, and the forward end of this vane is connected to diaphragm means forming a movable wall of a variable volume chamber to which pitot pressure is admitted, in an arrangement such that the pitot pressure in said variable volume chamber produces a compressive force on the articulated vane which acts to aid the pilot's movement of the control surface when the control surface is deflected.

In the preferred arrangement, the variable volume chamber lies within the walls of the fixed main part of the aircraft surface, and between the rear spar of said fixed main part and the diaphragm means, the diaphragm means being in the form of a partition extending transversely within said fixed main part and comprising a number of panel or wall elements hinged to one another and to the side walls of said fixed part.

According to another aspect of the invention, a chamber is provided within the fixed part of the aerofoil structure, in the region in front of (or partly in front of and partly behind) the pivot of the control surface, and a balancing surface or plate, hingedly connected to the control surface, is arranged to move laterally to and fro within this chamber while remaining parallel, or almost parallel, to itself in the manner of a plunger, a substantial seal (when required) being maintained between the edges of the balancing plate and the walls of the chamber in which it moves, and a pressure differential representative of the pressure difference on the two sides of the control surface being applied across it.

In this way, a large degree of balancing is obtained within the space available; greater, for instance, than if the balancing surface were simply a shrouded extension of the control surface beyond its pivot.

Figure 2:
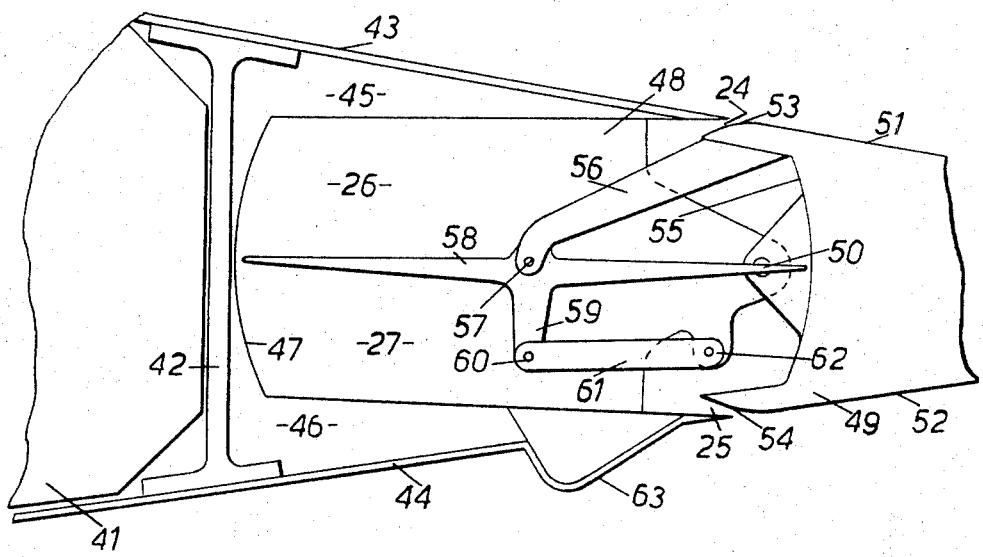
Figure 3:
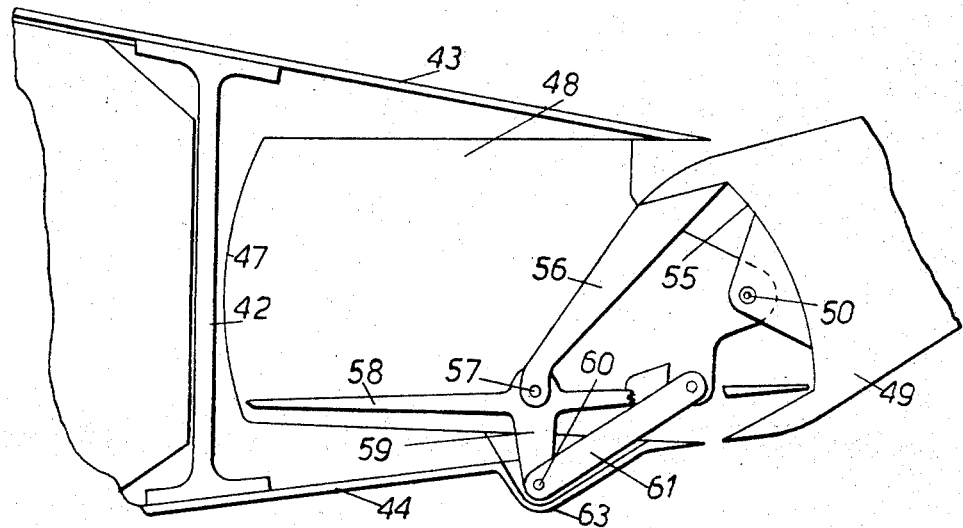
Figure 4:
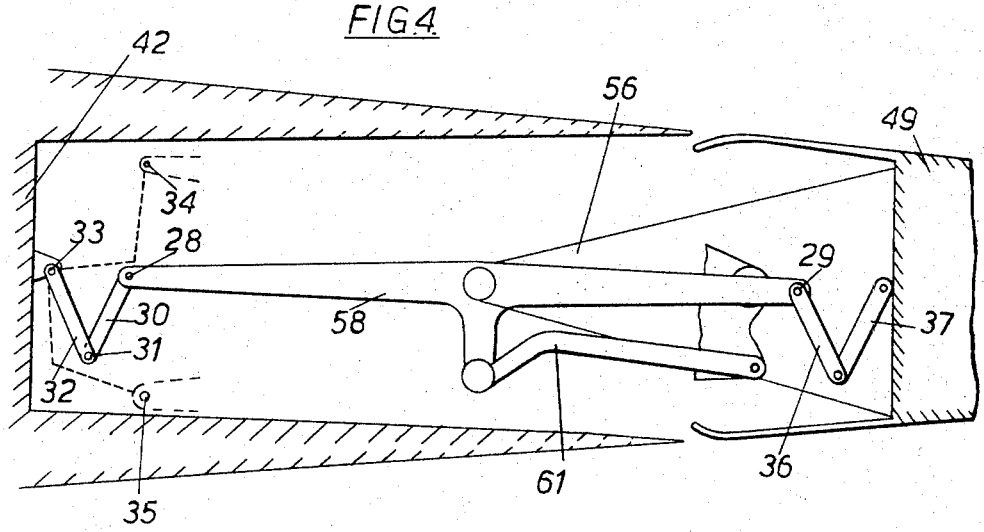
Figure 5:
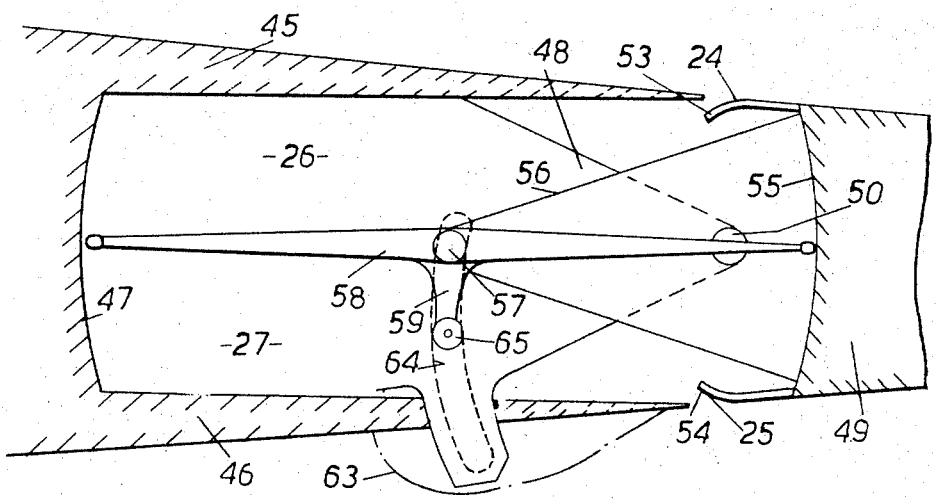

Arrangements according to the invention are illustrated by way of example in the accompanying drawings, in which:

FIG. 1 is a diagrammatic section through part of the fin and rudder of an aircraft, FIG. 2 is a similar view of a second embodiment, FIG. 3 shows the arrangement of FIG. 2 in the fully deflected condition, FIG. 4 shows a mechanical modification of the arrangement of FIG. 2, and FIG. 5 illustrates a further mechanical modification.

Referring firstly to FIG. 1, although the arrangement is shown applied to a fin or rudder, the arrangement could equally well be applied to a horizontal stabilizer and elevator, or to the outer portion of a wing and an aileron. In actual practice, in the case of application to a fin and rudder it might well be desired to take additional steps to ensure complete symmetry of operation; however, as these means are not essential to the invention they have been omitted for the sake of clarity.

The fin has port and starboard outer skins 1 and 2 and a rear spar 3. The rudder 4 is hinged along an axis 5 and forward of this axis it has a nosing 6, part-circular in cross section, to which is attached a forwardly-projecting extension member 7.

Hinged at its rear end to the forward end of extension member 7 is a forwardly-extending sealing vane 8 that has a further hinge connection 9 at its forward end. The hinges 9 and 10 are made either in the form of strips of flexible material or like close fitting piano hinges, such that there will be no air leakage, or substantially none, from one side to the other. The spaces 11 and 12 formed between the outer skins 1 and 2 of the fin, and the extension member 7 and sealing vane 8, are in communication with the atmosphere on opposite sides of the rudder through slots 14 and 13 between the aft edges of the skins 1 and 2 and the rudder nosing 6.

As long as the aeroplane is flying symmetrically and the rudder is in its central position, the atmospheric pressure on either side of the rudder will be the same. Consequently, the pressure in spaces 11 and 12 will be the same, and there will be no differential load tending to deflect the rudder. However, upon deflection of the rudder there will be a slight rise in pressure on one side and a fall in pressure on the other side, and these modified pressures will be communicated through slots 13 and 14 to spaces 12 and 11. This in turn will create an out-of-balance load acting upon members 7 and 8 in such a direction as to tend to assist the pilot.

The arrangement so far described is a well known one, which operates satisfactorily, but there is a limitation of the force which can be created to assist the pilot. For a given maximum angle, it is usually impossible to lengthen the member 7 and if the vane 8 is lengthened the rear spar 3 of the fin will have to be brought further forward, which is objectionable for structural reasons.

To overcome this difficulty, the leading edge of the sealing vane 8 is hinged at point 9 to a laterally-extending sealing panel 15, having one vertical edge hinged and sealed at 16 to the side skin 2. The opposite edge of this panel is connected to the opposite side skin 1 by further articulated sealing panels 17 and 18 hinged at 19, 20 and 21. Panels 15, 17 and 18 enclose a space 22 just aft of the rear spar 3. To this space pitot air is admitted through a scoop 23 which, in an actual embodiment, may well be in the form of a tube leading to a point somewhat in front of the leading edge of the fin.

The pitot pressure is a function of the speed of the aeroplane but will not vary with rudder deflection. However, this pressure will be substantially above the pressure in spaces 11 and 12 and will thus exert a compressive force upon the vane 8. With the rudder in the central position this force will not result in a turning moment about the hinge axis 5. As the rudder is deflected there will be a turning moment roughly proportional to the deflection. In fact, it will be found that, by the means as described, the degree of rudder assistance given to the pilot can be approximately doubled, without increasing the distance between the rudder hinge 5 and the rear spar 3.

It will be appreciated that while the drawing indicates members 15, 17 and 18 as solid panels, either all or some of these could be replaced by flexible sealing members, as long as provision is made to guide member 8 and to exert a compressive force on it, resulting from the pitot pressure in chamber 22.

FIGS. 2 and 3 of the drawings show an alternative embodiment of the invention. As in the case of the previous embodiment, the arrangement could equally well apply to a horizontal stabilizer and elevator or to the outer part of the wing and the aileron. In FIG. 2 the rudder is shown in the central or neutral position. FIG. 3 shows the rudder fully deflected to one side, and FIG. 4 is generally similar to FIG. 2 but illustrates an alternative version of one aspect of the mechanical arrangement.

Referring to FIG. 2, the rear portion of the fin 41 comprises a rear spar 42 and two outer side skin members 43 and 44 each supported by secondary structure indicated at 45 and 46. There is an internal concave part-cylindrical (or part-conical) type of surface 47, the purpose of which will be explained later. At intervals up the height of the fin there are diaphragms 48 attached to the structural members 45 and 46 and serving to support the movable rudder 49 which is hinged at 50. The means for operating the rudder are not shown as they are immaterial to the discussion of the present invention. However, it will be seen that the rudder has two outer skin members 51 and 52 which are curved inwards at the forward end, as indicated at 53 and 54, and then continued rearwardly to join with a part cylindrical (or part-conical) type surface 55 which faces toward the above-mentioned surface 47, thereby forming a cavity in the vicinity of the rudder hinge 50.

Attached to the forward end of the rudder are a number of forwardly-extending brackets spaced up its height one of which is shown at 56. The precise shape of the bracket may be varied according to the wishes of the designer. It terminates in a pivot 57 which is located ahead of the rudder pivot 50 and, most conveniently, placed on the center line of the fin and rudder. Pivotally-mounted at 57 and supported by bracket 56 is a balancing surface 58 which extends forward and aft of the pivot and is of such a width that it reaches very nearly from surface 47 to surface 55. Rigidly attached to the balancing surface 58 in the region of the pivot 57 are a number of lugs 59 pivotally-connected at 60 to a constraining link 61 which in turn is pivotally-connected at 62 to the rudder hinge support bracket 48.

It will be seen from FIGS. 2 and 3 that upon movement of the rudder 49 from one side to another the balancing surface 58 sweeps through the space defined between the walls 47 and 55 and bounded by the supporting structure indicated at 45 and 46. The length of the restraining link 61 and the positions of pivots 60 and 62 have been chosen as either to constrain the balancing surface to remain parallel to itself or to turn only slightly, in order than upon full movement of the rudder the surface 58 displaces the greatest possible volume within the width and length available. FIG. 3 shows the rudder fully deflected and the balancing surface 58 at one limit of its travel and just slightly turned. FIG. 3 also indicates the object of a local bulge 63 in the skin 44, in as much as this provides the necessary space to permit full movement of the pivot 60 without the need for having an opening in the skin member 44. However, in some instances it may be preferable merely to provide a hole in the skin, with or without a mechanical door to close it.

Between the skin members 43 and 44 of the fin and the forward portions of the rudder, at 53 and 54, there are gaps 24 and 25. These provide leakage paths such that the static pressure head at either side of the fin and rudder is freely communicated to either side of the balancing surface 58, i.e. into spaces 26 and 27, respectively. With the rudder in its central position and the aeroplane flying symmetrically the static pressures at 24 and 25 will be equal. However, upon deflection of the rudder there will be pressure difference resulting also in a pressure different in the spaces 26 and 27. Provided that the leakage path between the edges of the balancing plate 58 and the curved walls 47 and 55 is considerably smaller than gaps 24 and 25, the pressure differential on the balancing plate will be a substantial portion at least of the external pressure difference, thus providing a substantial balancing moment assisting the pilot in his effort to move the control surface.

There may be difficulty, in that it could be troublesome and expensive to maintain the gaps at the edge of the balancing plate sufficiently small to keep the leakage at these points at an acceptable figure. To overcome this difficulty, rubber seals may be employed or seals constructed similarly to a nylon brush. Alternatively, these gaps may be sealed by means of long articulated strips attached to the edges of the balancing plate and to the structures of the fin and rudder, respectively, by continuous hinges. Such an arrangement is shown in FIG. 4. The balancing plate itself is somewhat narrower than that shown in FIGS. 2 and 3, terminating in hinges 28 and 29. Attached by means of hinge 28 is a strip 30 hinged at 31 to a further strip 32. This in turn is hinged to the rear spar at 33. With full rudder movement to either side, hinge point 28 moves to positions 34 and 35, respectively, and the extreme positions of the balancing plate as well as the sealing strips are sown in broken lines. A similar sealing arrangement is provided at the aft edge of the sealing plate by means of strips 36 and 37.

A further modification is shown in FIG. 5. In this arrangement, the restraining link 61 of FIGS. 2 to 4 is replaced by a cam track 64 in which is engaged a roller 65 at the end of the lug 59 on the balancing surface 58.

What we claim is:-

1. An aircraft control surface arrangement, wherein the nose of the movable control surface has a rigid forward extension or vane which is articulated at an intermediate point along its length, and the forward end of this vane is connected to diaphragm means forming a movable wall of a variable volume chamber to which pitot pressure is admitted, the variable volume chamber lying within external walls of the fixed main part of the aircraft surface and between a rear spar of said fixed main part and the diaphragm means, and the diaphragm means being in the form of a partition extending transversely within said fixed main part and comprising a number of panel or wall elements hinged to one another and to the side walls of said fixed part, whereby the pitot pressure in said variable volume chamber produces a compressive force on the articulated vane which acts to aid the pilot's movement of the control surface when the control surface is deflected.

2. An arrangement according to claim 1 wherein the articulated forward extension or vane also lies within the walls of the fixed main part of the aircraft surface, and each of the chambers between said articulated vane and the two side walls of said fixed part is in communication with the external air pressure existing on the same side of the movable control surface as the chamber.

3. An aircraft control surface arrangement, wherein a chamber is provided within the fixed part of the aerofoil structure, in a region at least partly in front of the pivot of the control surface, and a balancing plate, hingedly connected to the control surface, is arranged to move laterally to and fro within this chamber while remaining substantially parallel to itself in the manner of a plunger, a substantial seal (when required) being maintained between the edges of the balancing plate and the walls of the chamber in which it moves, and a pressure differential representative of the pressure difference on the two sides of the control surface being applied across it.

4. An arrangement according to claim 3, wherein the balancing surface is hingedly mounted at a point intermediate its fore and aft edges on structure secured to the moving control surface and has a linkage connecting it to a fixed part of the structure, in a manner such as to keep it almost parallel to itself as it moves laterally.

5. An arrangement according to claim 3, wherein said chamber lies between the side walls of the fixed part of the structure and is bounded fore and aft by a fixed internal rearward-facing wall of the fixed structure and a moving forward-facing wall of the control surface, respectively.

6. An arrangement according to claim 5, wherein said rearward and forward facing chamber walls are curved for the purpose of maintaining a substantial seal with the fore and aft edges of the balancing surface, respectively, as it moves across the chamber.

7. An arrangement according to claim 3, wherein sealing means are provided between the fore and aft edges of the balancing surface and the adjacent chamber walls.

8. An arrangement according to claim 7, wherein said sealing means comprise articulated strip or panel elements hinged, on the one hand, to the fore and aft edges of the balancing surface and, on the other hand, to the adjacent chamber walls.

* * * * *